United States Patent Office
3,755,440
Patented Aug. 28, 1973

3,755,440
AMINO-NAPHTHOIC THIOLANHYDRIDES
Stanley B. Mirviss, Stamford, Conn., assignor to Stauffer Chemical Company, New York, N.Y.
No Drawing. Continuation-in-part of abandoned application Ser. No. 788,053, Dec. 30, 1968. This application Oct. 22, 1970, Ser. No. 83,227
Int. Cl. C07c 153/00
U.S. Cl. 260—545 R   8 Claims

ABSTRACT OF THE DISCLOSURE

Vinyl polymer compositions are stabilized against degradation and discoloration due to heat by adding to the polymer a stabilizing amount of a novel compound of the formula:

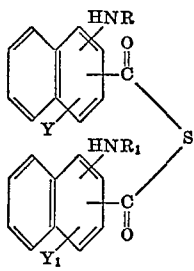

wherein Y and $Y_1$ are hydrogen or alkyl groups containing from 1 to about 12 carbon atoms and R and $R_1$ are hydrogen, aryl or alkyl groups containing from 1 to about 12 carbon atoms.

RELATED APPLICATION

This application is a continuation-in-part of application Ser. No. 788,053, filed Dec. 30, 1968 now abandoned.

TECHNICAL DISCLOSURE OF THE INVENTION

According to the present invention there is provided novel compounds of the formula:

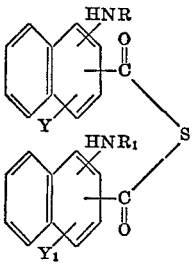

wherein Y and $Y_1$ are hydrogen or alkyl groups containing from about 1 to about 12 carbon atoms and R and $R_1$ are hydrogen, aryl, or alkyl groups containing from 1 to about 12 carbon atoms; and, heat stable compositions comprising the novel compounds intimately admixed with vinyl polymers.

A preferred group of these compounds are those corresponding to the formula:

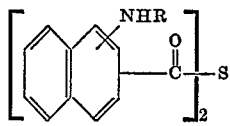

where R is as defined above.

The above described compounds are found to be particularly effective as heat stabilizers in vinyl polymers such as polyvinyl halides; polyvinylidene halides; polyolefins such as polyethylene, and chlorinated polyethylene; polypropylene, acrylonitrile-butadiene-styrene resins, copolymers made from monomers at least one of which is a halogen containing monomer; and, post chlorinated polymers.

The term alkyl as used herein is intended to denote a group consisting essentially of carbon and hydrogen of from 1 to 12 carbon atoms derived from the methane series. Illustrative of the moieties represented by the above definition are such groups as methyl, ethyl, isopropyl, butyl, hexyl, nonyl and dodecyl. It is understood that such groups can contain certain other groups but such groups must be present in such a manner that they do not substantially change the nature of the hydrocarbon group. Such groups can contain nitrogen, oxygen, sufur or halogen. For example, chlorine or bromine can be present as substituents in the group. The term halogen as used herein means fluorine, chlorine, bromine, and iodine.

The term aryl as used herein is intended to denote a phenyl, alkyl phenyl, or substituted phenyl group containing up to about 12 carbon atoms. It is understood that such aryl radicals can contain other groups but such groups must be present in such a manner that they do not substantially change the nature of the aryl radical. Such groups can contain nitrogen, oxygen, sulfur or halogen. For example, chlorine can be present as a substituent.

The novel thiolanhydrides of the present invention can be prepared in good yields by reacting a thiolacid and an acyl chloride in a suitable solvent at from about 0° C. to about 125° C. The temperature range depends upon the particular reactants involved and the solvent employed. The reaction may be carried out at from subatmospheric to superatmospheric pressure. Provision must, however, be made for removal of the HCl formed from the reaction. This may be accomplished by the use of an acid acceptor such as pyridine or triethylamine.

Solvents suitable for the reaction are aromatic solvents such as benzene, toluene and xylene, chlorinated solvents such as chloroform, carbon tetrachloride and chlorobenzene, paraffinic solvents such as heptane, hexane or cyclohexane and solvents such as pyridine, tetrahydrofuran and acetonitrile.

For example, 2-amino-1-naphthoic thiolanhydride can be prepared by reacting 2-amino-1-naphthoyl chloride and 2-amino-1-naphthoic thiolacid in an organic solvent at from about 0° C. to about 100° C. using a triethylamine as the HCl acceptor. After filtering out the triethylamine hydrochloride the benzene is washed with a dilute sodium carbonate solution to neutralize any HCl which might still be present in the product as an amino hydrochloride. The solvent is removed from the system to recover the 2-amino-1-naphthoic thiolanhydride.

The thiolacid can be prepared by reacting an acyl chloride with $H_2S$ in an anhydrous acid acceptor such as pyridine at from $-10°$ C. to about 100° C. preferably from about 0° C. to about 50° C.

The thiolanhydrides useful in the practice of the present invention can also be prepared by reacting a suitable acid chloride with a slight excess of $Na_2S$ in a solution with water at from $-5°$ C. to about 100° C. The reaction generally taking place at a pH of from about 8 to about 10. The reaction can be conducted at subatmospheric to superatmospheric pressure. The thiolanhydride can be recovered from the water phase. This method is at times the preferred method of preparing thiolanhydride compounds; for example, the thiolanhydride can be recovered from the water phase, and little subsequent purification is necessary to recover a useable material.

The term vinyl polymer as used herein denotes those solid homopolymers, copolymers, terpolymers and post chlorinated polymers which require heat stabilization made from ethylenically unsaturated monomers by an addition polymerization reaction. Included within the definition of ethylenically unsaturated materials useful in the preparation of polymers suitable for the practice of the present invention are the vinyl halide monomers of the formula:

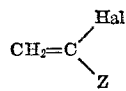

wherein Z can be selected from halogen or hydrogen and Hal is halogen for example, vinyl chloride, vinyl bromide, vinylidene chloride and the like; mono-olefinic hydrocarbons such as ethylene and propylene; styrene and its nuclear, alpha-alkyl or aryl substituted derivatives such as p-methyl or butyl styrene; alpha-methyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g., methyl and propyl methacrylate; alkyl crotonates; alkyl acrylates, e.g., methyl acrylate, hydroxy ethyl acrylate, and tertiary butyl-amino acrylate; isopropenyl esters; isopropenyl halides; vinyl esters of halogenated acids; alkyl and methallyl esters; esters of alkenyl-alcohols; haloalkyl acrylates; alkyl alpha-cyano acrylates; maleates, e.g., monomethyl maleate, diethyl maleate; fumarates; e.g., monoethyl fumarate and dimethyl fumarate; diethyl glutaconate; mono-olefinically unsaturated organic nitriles such as fumaronitrile, acrylonitrile and methacrylonitrile; mono-olefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl β-chloroethyl sulfide can also be utilized. Diolefinically unsaturated hydrocarbon containing two olefinic groups in conjugated relation and the halogenated derivatives such as butadiene-1,3 and 2-chloro-butadiene-1,3, can also be utilized in the preparation of suitable polymer compositions.

The term vinyl halide polymer, ethylene polymer, and propylene polymer is used herein to denote homopolymers, copolymers and terpolymers of the named monomer and suitable monomers which can be polymerized by an addition polymerization reaction.

The following are examples of copolymers which can be used in the practice of the present invention: vinyl chloride-vinyl acetate, vinyl chloride-vinylidene chloride, vinyl chloride-acrylonitrile, vinyl chloride-maleate esters, vinyl chloride-vinyl ethers, vinyl chloride-ethylene, vinyl chloride-propylene, ethylene-vinyl acetate, ethylene-acrylonitrile. The examples are illustrative only and are not intended to be exhaustive of the many copolymers whose stability can be enhanced by the compounds of the present invention.

The proportion of the amino-thiolanhydrides of the present invention which must be employed to make satisfactory heat stabilized compositions will vary over a wide range depending upon the particular vinyl polymer, the degree of stabilization needed, the end use of the resin, the presence of plasticizers and co-stabilizing additives, as well as the time and temperature requirements of the final processing. The presence of a stabilizing amount of from about 0.01% to about 15% by weight of the compounds of the present invention will be sufficient for most applications, although the preferred range is from about 0.5% to about 7.0% by weight of compounds of the present invention based on the weight of the polymer.

The compounds of the present invention can be advantageously employed in combination with co-stabilizing additives known in the art. The preferred co-stabilizing additives are the organic phosphites, dialkyl and diaryl phosphonates, organic and inorganic sulfites such as $Na_2SO_3$, $NaHSO_3$ and $(RO)_2SO$ where R is alkyl or arylalkyl radical, zinc soaps, phenolic antioxidants, mercaptides, organotin compounds such as dialkyltin carboxylates or mercaptides, alkylstannoic acids and alkylthiostannoic acids.

The compounds of the present invention can be incorporated into the polymer composition by methods familiar to one skilled in the art for the addition of similar material to the polymer blends such as by mixing in a ribbon mixer or by the intensive mixing of a Henschel™ or Welex™ mixer.

The novel compounds of the present invention can be prepared in accordance with procedures known in the art, as well as by the procedures of the following examples:

EXAMPLE I

This example illustrates the preparation of 2-amino-1-naphthoic thiolanhydride, i.e.

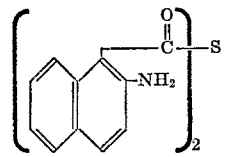

Step 1.—Preparation of 2-amino-1-naphthoyl chloride

To 187 grams (1 mole) of 2-amino-1-naphthoic acid dissolved in 300 milliliters of ethylether is added 45.9 grams (0.33 mole) of phosphorus trichloride. The mixture is refluxed with agitation for 6 hours under a nitrogen atmosphere. At the end of 6 hours the reaction mixture is permitted to separate into two layers. The 2-amino-1 naphthoyl chloride is recovered from the system by removal of the ether and can be used in the subsequent steps.

Step 2.—Preparation of 2-amino-1-naphthoic thiolacid

At a low rate $H_2S$ is bubbled into a mixture of 200 cubic centimeters of benzene and 19.8 grams (0.25 mole) of pyridine below 10° C. To the pyridine, benzene, $H_2S$ mixture is slowly added 51.3 grams (0.25 mole) of 2-amino-1-naphthoyl chloride over a period of 2 hours. The $H_2S$ is added continuously to the system and the temperature of the reaction mixture is held below 10° C. The addition of $H_2S$ is continued for a half hour after the addition of the 2-amino-1-naphthoyl chloride is completed. About 68 grams (2.0 mole) of $H_2S$ is added to the system. The reaction mixture is held for 16 hours at 10° C. under a nitrogen atmosphere. The reaction mixture is brought to room temperature and the pyridine hydrochloride is filtered from the mixture. The benzene mixture is washed with water and dried over calcium sulfate.

Step 3.—Preparation of 2-amino-1-naphthoic thiolanhydride

A gas inlet tube is passed into the naphthoic thiolacid benzene mixture prepared according to the previous step and a moderate nitrogen purge passed through the system. 2-amino - 1 - naphthoyl chloride in the amount of 45.2 grams (0.22 mole) is added to the system at room temperature. The reaction mixture is refluxed for 8 hours. At the end of 8 hours the reaction mixture is brought to room temperature and washed with 50 milliliters of a 3 percent sodium carbonate solution. The pH of the water layer is then adjusted to a range of 8–11 by the addition of sodium hydroxide. The 2-amino-1-naphthoic thiolanhydride is recovered from the reaction mixture by the removal of the benzene at low pressure.

The 2-amino-1-naphthoic thiolanhydride is purified by crystallization from a solvent.

EXAMPLE II

This example illustrates the preparation of 1-amino-2-naphthoic thiolanhydride, i.e.

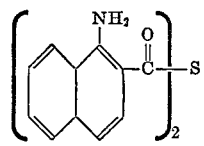

Step 1.—Preparation of 1-amino-2-naphthoyl chloride

To 187 grams (1 mole) of 1-amino-2-naphthoic acid dissolved in 300 milliliters of ethylether is added 45.9 grams (0.33 mole) of phosphorus trichloride. The mixture is refluxed with agitation for 6 hours under a nitrogen atmosphere. At the end of 6 hours the reaction mixture is permitted to separate into two layers. The 1-amino-2-naphthoyl chloride is recovered from the system by removal of the ether and can be used in the subsequent steps.

Step 2.—Preparation of 1-amino-2-naphthoic thiolacid

At a low rate, $H_2S$ is bubbled into a mixture of 200 cubic centimeters of benzene and 19.8 grams (0.25 mole) of pyridine which is maintained at a temperature below 10° C. To the pyridine, benzene, $H_2S$ mixture is slowly added 51.3 grams (0.25 mole) of 1-amino-2-naphthoyl chloride over a period of 2 hours. The $H_2S$ is added continuously to the system and the temperature of the reaction mixture is held below 10° C. The addition of $H_2S$ is continued for a half hour after the addition of the 1-amino-2-naphthoyl chloride is completed. About 68 grams (2.0 mole) of $H_2S$ is added to the system. The reaction mixture is held for 16 hours at 10° C. under a nitrogen atmosphere. The reaction mixture is brought to room temperature and the pyridine hydrochloride is filtered from the mixture. The benzene mixture is washed with water and dried over calcium sulfate.

Step 3.—Preparation of 1-amino-2-naphthoic thiolanhydride

A gas inlet tube is passed into the naphthoic thiolacid benzene mixture prepared according to the previous step and a moderate nitrogen purge passed through the system. 1-amino-2-naphthoyl chloride in the amount of 45.2 grams (0.22 mole) is added to the system at room temperature. The reaction mixture is refluxed for 8 hours. At the end of 8 hours, the reaction mixture is brought to room temperature and washed with 50 milliliters of a 3 percent sodium carbonate solution. The pH of the water layer is then adjusted to a range of 8–11 by the addition of sodium hydroxide. The 1-amino-2-naphthoic thiolanhydride is recovered from the reaction mixture by the removal of the benzene at low pressure.

The 1-amino-2-naphthoic thiolanhydride is purified by crystallization from a solvent.

EXAMPLE III

This example illustrates the preparation of 2-methyl-amino-3-naphthoic thiolanhydride, i.e.

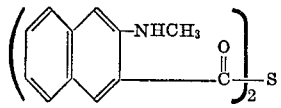

Step 1.—Preparation of 2-methyl amino-3-naphthoyl chloride

To 201 grams (1 mole) of 2-methyl amino-1-naphthoic acid dissolved in 300 milliliters of ethyl ether is added 45.9 grams (0.33 mole) of phosphorus trichloride. The mixture is refluxed with agitation for 6 hours under a nitrogen atmosphere. At the end of 6 hours the reaction mixture is permitted to separate into two layers. The 2-methyl amino-3-naphthoyl chloride is recovered from the system by removal of the ether and can be used in the subsequent steps.

Step 2.—Preparation of 2-methyl amino-3-naphthoic thiolacid

At a low rate, $H_2S$ is bubbled into a mixture of 200 cubic centimeters of benzene and 19.8 grams (0.25 mole) of pyridine which is maintained at a temperature below 10° C. To the pyridine, benzene, $H_2S$ mixture is slowly added 54.5 grams (0.25 mole) of 2-methyl amino-3-naphthoyl chloride over a period of 2 hours. The $H_2S$ is added continuously to the system and the temperature of the reaction mixture is held below 10° C. The addition of $H_2S$ is continued for a half hour after the addition of the 2-methyl amino-3-naphthoyl chloride is completed. About 68 grams (2.0 mole) of $H_2S$ is added to the system. The reaction mixture is held for 16 hours at 10° C. under a nitrogen atmosphere. The reaction mixture is brought to room temperature and the pyridine hydrochloride is filtered from the mixture. The benzene mixture is washed with water and dried over calcium sulfate.

Step 3.—Preparation of 2-methyl amino-3-naphthoic thiolanhydride

A gas inlet tube is passed into the naphthoic thiolacid benzene mixture prepared according to the previous step and a moderate nitrogen purge passed through the system. 2-methyl amino-3-naphthoyl chloride in the amount of 48.3 grams (0.22 mole) is added to the system at room temperature. The reaction mixture is refluxed for 8 hours. At the end of 8 hours, the reaction mixture is brought to room temperature and washed with 50 milliliters of a 3 percent sodium carbonate solution. The pH of the water layer is then adjusted to a range of 8–11 by the addition of sodium hydroxide. The 2-methyl amino-3-naphthoic thiolanhydride is recovered from the reaction mixture by the removal of the benzene at low pressure.

The 2-methyl amino-3-naphthoic thiolanhydride is purified by crystallization from a solvent.

EXAMPLE IV

A number of stabilized polymer compositions are prepared by intimately admixing a particulate sample of each of the below listed polymers with 3.0%, by weight of each polymer sample, of one of the novel stabilizers of this invention as listed hereinbelow. The individual stabilizer is admixed with the particulate polymer by a means suitable for the particular polymer being evaluated. After mixing, the stabilized composition is tested by conventional milling on a heated two roll mill to determine its heat stability. The mill rolls are heated to a temperature which is sufficient to permit milling of the polymer and which is also sufficiently high to degrade an unstabilized sample of the same polymer in two hours. Samples are taken from the mill every 10 minutes and evaluated. Unmilled samples are fluxed to form a homogenous composition and are aged at ambient temperatures. In each case, the stabilizers of this invention are found to provide enhanced stabilization to each of the polymers with which they are admixed.

The polymers evaluated by the above procedure are:

Polyethylene (density 0.915)
Polyethylene (density 0.945)
Polypropylene
Polyvinyl chloride
Polyvinylidene chloride
Styrene-acrylonitrile-butadiene copolymer (ABS Type B)
Styrene-acrylonitrile-butadiene copolymer (Type G)
Vinyl chloride:vinyl acetate copolymer (90:10)
Vinyl chloride:acrylonitrile copolymer (90:10)

The stabilizers thus evaluated are:

2-amino-1-naphthoic thiolanhydride
1-amino-2-naphthoic thiolanhydride
2-methylamino-3-naphthoic thiolanhydride Variations may be made in proportions, procedures and materials without departing from the scope of this invention as defined in the following claims.

What is claimed is:

1. Compounds of the formula:

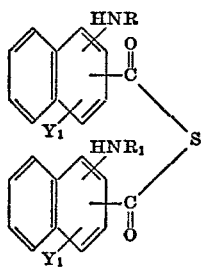

wherein Y and $Y_1$ are selected from the group consisting of hydrogen and alkyl groups containing from 1 to about 12 carbon atoms and R and $R_1$ are selected from the group consisting of hydrogen, alkyl groups containing from 1 to about 12 carbon atoms and aryl groups containing up to about 12 carbon atoms.

2. The compound of claim 1, wherein Y and $Y_1$ are hydrogen.

3. The compounds of claim 1, wherein R and $R_1$ are hydrogen.

4. The compounds of claim 1, wherein Y and $Y_1$ are equivalent and wherein R and $R_1$ are equivalent.

5. Compounds of the formula:

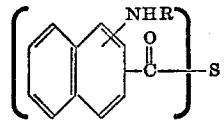

wherein R is selected from the group consisting of hydrogen, alkyl groups containing from 1 to about 12 carbon atoms and aryl groups containing up to about 12 carbon atoms.

6. 2-amino-1-naphthoic thiolanhydride.
7. 1-amino-2-naphthoic thiolanhydride.
8. 2-methylamino-3-naphthoic thiolanhydride.

References Cited
FOREIGN PATENTS
201,389    9/1967    U.S.S.R. _____ 260—54 S

LORRAINE A. WEINBERGER, Primary Examiner
R. GERSTL, Assistant Examiner

U.S. Cl. X.R.
260—45.9 R

UNITED STATES PATENT AND TRADEMARK OFFICE
CERTIFICATE OF CORRECTION

PATENT NO. : 3,755,440
DATED : August 28, 1973
INVENTOR(S) : Stanley B. Mirviss

It is certified that error appears in the above-identified patent and that said Letters Patent are hereby corrected as shown below:

Column 7, Claim 2, "compound" should read --compounds-- .

Column 8, Claim 5, formula, insert sub-two after bracket.

Signed and Sealed this

Fifteenth Day of February 1977

[SEAL]

Attest:

RUTH C. MASON
*Attesting Officer*

C. MARSHALL DANN
*Commissioner of Patents and Trademarks*